United States Patent [19]
Golden

[11] Patent Number: 5,940,453
[45] Date of Patent: Aug. 17, 1999

[54] ARTIFICIAL FADING FOR FREQUENCY OFFSET MITIGATION

[75] Inventor: Glenn David Golden, Boulder County, Colo.

[73] Assignee: Lucent Technlogies Inc., Murray Hill, N.J.

[21] Appl. No.: 08/756,293

[22] Filed: Nov. 25, 1996

[51] Int. Cl.$^6$ ..................................................... H04L 1/06
[52] U.S. Cl. ........................ 375/347; 455/273; 455/303
[58] Field of Search .................... 370/210, 339; 375/267, 347; 455/137, 273, 303

[56] References Cited

U.S. PATENT DOCUMENTS

| | | | |
|---|---|---|---|
| 5,481,570 | 1/1996 | Winters | 375/347 |
| 5,697,083 | 12/1997 | Sano | 455/276.1 |
| 5,768,477 | 6/1998 | Johnson et al. | 395/22 |

FOREIGN PATENT DOCUMENTS 735 702  10/1996  European Pat. Off. .

OTHER PUBLICATIONS

Winters, J. Signal Acquisitions and Tracking with Adaptive Arrays in the Digital Mobile Radio System IS–54 with Flat Fading; published in IEEE Transactions on Vehicular Technology, vol. 42, No. 4, Nov. 1993, pp. 377–384.

Winters, J. et al. The Impact of Antenna Diversity on the Capacity of Wireless Communicatiuons Systems, published in IEEE Transactions on Communications, vol. 42, No. 2/3/4, Feb., Mar. Apr. 1994, pp. 1740–1751.

S. Bellini et al., "Digital Frequency Estimation in Burst Mode QPSK Transmission", IEEE Transactions On Communications, vol. 38, No. 7, pp. 959–961, Jul. 1990.

*Primary Examiner*—Melvin Marcelo

[57] ABSTRACT

An apparatus for performance improvement of a digital wireless receiver comprises a processing circuit for processing a plurality of received signals and providing a processed signal, wherein each of the plurality of received signals is multiplied by a corresponding time-varying complex variate to yield one of a plurality of modified signals, and the plurality of modified signals are then weighed and combined to provide the processed signal; and a generation circuit for generating the corresponding time-varying complex variate.

18 Claims, 2 Drawing Sheets

ARTIFICIAL FADING FOR FREQUENCY OFFSET MITIGATION

CROSS REFERENCES TO RELATED APPLICATIONS

This application is related to U.S. patent application Ser. No. 08/716,659, now abandoned, entitled "Joint Timing, Frequency And Weight Acquisition For An Adaptive Array" filed on Sep. 6, 1996, U.S. patent application Ser. No. 08/606,777, now U.S. Pat. No. 5,887,037 entitled "Introducing Processing Delay As A Multiple Of The Time Slot Duration" filed on Feb. 27, 1996 and copending U.S. patent application No. 08/695,492, entitled "Output Signal Modification For Soft Decision Decoding" filed on Aug. 12, 1996.

FIELD OF THE INVENTION

The present invention relates to the field of wireless communication and more particularly to digital wireless communication systems.

BACKGROUND OF THE INVENTION

In wireless communication systems, the use of antenna arrays at the base station has been shown to increase both range, through increased gain, and capacity, through interference suppression. With adaptive antenna arrays, the signals received by multiple antenna elements are weighted and combined to improve system performance, e.g., by maximizing the desired receive signal power and/or suppressing interference. The performance of an adaptive antenna array increases dramatically with the number of antennas. Referring to an article entitled, "The Impact of Antenna Diversity on the Capacity of Wireless Communication Systems," by J. H. Winters, R. D. Gitlin and J. Salz, in IEEE Trans. on Communications, April 1994, it is shown that using an M element antenna array with optimum combining of the received signals can eliminate $N \leq M-1$ interferers and achieve an M-N fold diversity gain against multipath fading, resulting in increased range.

Most base stations today, however, utilize only two receive antennas with suboptimum processing, e.g., selection diversity where the antenna having the larger signal power is selected for reception and processing. It is desirable to be able to modify existing base stations to accommodate larger arrays of antennas and/or improved received signal combining techniques. However, modifying existing equipment is difficult, time consuming, and costly, in particular since equipment currently in the field is from a variety of vendors.

One alternative is to utilize an applique, which is an outboard signal processing box, interposed between the current base antennas and the input to the base station, which adaptively weights and combines the received signals fed to the base station, optionally utilizing additional antennas. FIG. 1 shows a base station utilizing an applique. A key to the viability of utilizing the applique approach is that it should require little, if any, modification of the base station equipment. This constraint implies that the processing performed by the applique must be transparent to the existing equipment. Ideally, the signal emerging from the applique should appear to the existing base station as a high-quality received signal from a single antenna.

As in many passband digital communications systems which operate at RF frequencies, it is often preferable to demodulate or "downconvert" the frequency band of interest to a lower frequency band and to perform the requisite digital signal processing on this lower frequency replica of the received signal. Downconversion permits the analog to digital (A/D) conversion and subsequent signal processing to be performed at a lower rate, thus decreasing the implementation cost and complexity of the digital signal processing hardware. Illustratively, downconversion to baseband will be considered.

The process of downconversion to baseband requires synthesis, at the receiver, of a reference signal located at the nominal carrier frequency of the signal to be demodulated. This reference signal is produced by a local oscillator (LO). At the relatively high RF frequencies used in cellular and Personal Communication System (PCS) band radio, practical considerations make it difficult to generate the LO signal with extreme precision, and some non-trivial frequency error or "carrier frequency offset" typically exists. Carrier frequency offset can result in performance degradation, especially when a coherent reference signal is used to derive the adaptive weights. In some circumstances, frequency offset alone can result in a significant excess mean-squared error (MSE). Therefore, there exists a need to reduce the performance degradation caused by carrier frequency offset.

SUMMARY OF THE INVENTION

In accordance with the present invention, there is provided an apparatus for performance improvement of a digital wireless receiver. The apparatus comprises a processing circuit for processing a plurality of received signals and providing a processed signal, wherein each of the plurality of received signals is multiplied by a corresponding time-varying complex variate to yield one of a plurality of modified signals, and the plurality of modified signals is then weighed and combined to provide the processed signal; and a generation circuit for generating the corresponding time-varying complex variate.

BRIEF DESCRIPTION OF THE DRAWINGS

A more complete understanding of the present invention may be obtained from consideration of the following description in conjunction with the drawings in which.

DETAILED DESCRIPTION OF VARIOUS ILLUSTRATIVE EMBODIMENTS

Although the present invention is particularly well suited for use in TDMA mobile radio systems and shall be described with respect to this application, the methods and apparatus disclosed here can be applied to other digital wireless communication systems. Although the present invention is particularly well suited for use with an applique and shall be described with respect to this application, the methods and apparatus disclosed here can be is equally well suited for an integrated solution for adaptive arrays in a base station.

Figure 1:
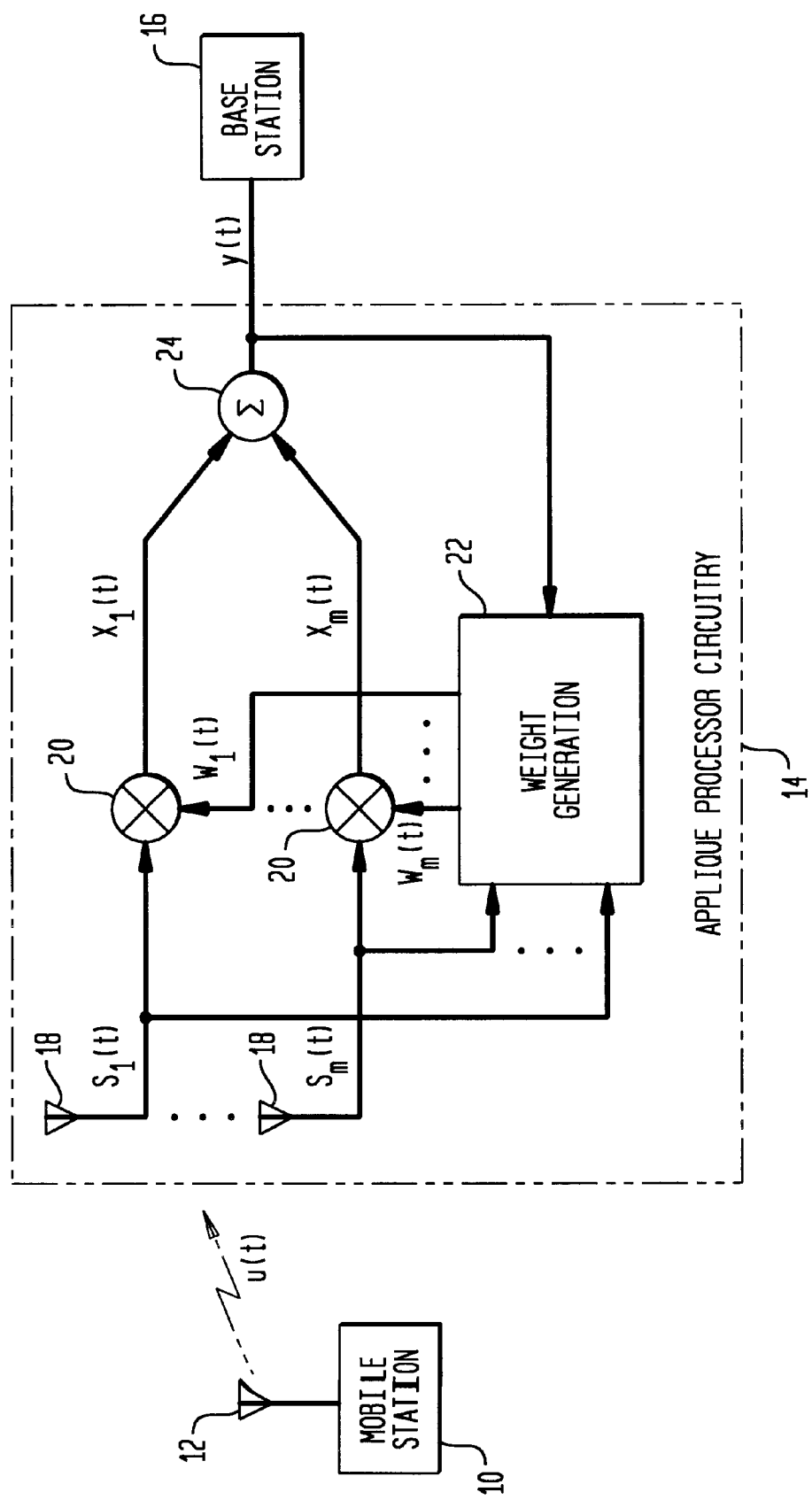
FIG. 1 is a block diagram of a prior art adaptive array applique using multiple antennas; and, FIG. 2 is a block diagram of applique processor circuitry embodying the present invention.

Referring to FIG. 1 there is shown a block diagram of a type of signal processing used in a base station applique. A signal u(t) transmitted by a mobile station 10 through a mobile antenna 12 is received by a base station 16 from M antennas 18, with received signals $s_1(t)$ to $s_M(t)$, respectively. The received signals are weighted using multipliers 20 having weights $w_1(t)$ to $w_M(t)$, respectively, to generate corresponding weighted signals $x_1(t)$ to $x_M(t)$. The weighted signals $x_1(t)$ to $x_M(t)$ are then combined using summer 24 to generate an output signal $y(t)$ which is then provided to the base station equipment. Weights $w_1(t)$ to $w_M(t)$ are generated by weight generation circuitry 22 using the received signals $s_1(t)$ to $s_M(t)$ and output signal $y(t)$. At the applique processor circuitry 14, received signals $s_1(t)$ to $s_M(t)$ are weighted and combined to improve signal quality at the output.

With the correct symbol timing and carrier frequency, the weights can be generated to combine the signals received from multiple antennas to increase gain and suppress interference, permitting operation even with noise and/or interference power that is greater than the signal power. Furthermore, in an adaptive array system designed to minimize the output mean-squared error (MSE), when the fading is sufficiently high, performance degradation caused by moderate levels of carrier frequency is relatively small. However, as the fading rate is reduced, the effects of carrier frequency offset become progressively worse, especially if a coherent reference signal is used to derive the adaptive weights. When there is no fading present, the frequency offset alone can result in a significant excess MSE.

A demonstration was conducted with an adaptive array system in which a small frequency offset was intentionally introduced and the excess radial MSE (that portion of the MSE due to the frequency offset) could be observed. When the scattering environment was relatively stationary, that is, when the fading rate was near zero, the radial MSE was relatively large. However, when the fading rate was increased somewhat, the radial MSE was observed to be reduced considerably. This result appears to be counterintuitive, as it would be expected that the MSE would increase in the presence of fading due to adaptive weight mistracking. However, when moderate frequency offset is present, the net effect is a reduction in MSE as the fading is increased, until a point at which the adaptive weights begin to mistrack the fading.

This counterintuitive behavior can be understood by considering the least-squares problem, $$\min_w \|Aw - b\|^2 \qquad \text{Equation 1.}$$

underlying the adaptive weight computation. Where $A^{L \times M}$ is the received data matrix, w is the set of adaptive weights to be determined, b is the reference signal vector, L is the window size over which the weight vector is computed, and the—ij-th element of A is the ith symbol-synchronous sample from the jth antenna.

When frequency offset is present, it can be shown that the minimization problem (Equation 1), is fundamentally incapable of yielding a small residual (low MSE) solution when the channel is stationary. The reason is that under these conditions, the reference vector b does not lie in the range space of A. However, when fading is present, the time variation of the fading channels across the observed data expands the range space of A, and it becomes possible to realize an adaptive weight vector w which results in a smaller residual. It is not necessary to have very rapid fading in order to obtain a significant advantage over the non-fading case. In an IS-136 system, it has been observed that a few hertz of fading significantly mitigates the effect of several hundred hertz of frequency offset.

By introducing a small amount of artificial fading at the receiver, the effects of frequency offset for the stationary channel situation can be mitigated without significantly increasing the mistracking penalty when fast fading is present. Artificial fading can be introduced at the receiver by multiplying each of the M received signals by a corresponding time-varying complex variate, illustratively as computed in real-time by a digital signal processor. The characteristics of the time-varying complex variate are not critical; in particular, the variation need not closely mimic actual fading. The key characteristics in choosing the variation rate and profile are that the fading rate be relatively low compared to actual maximum fading rates, and that the variates have relatively small correlation between channels. In some implementations, it may be desirable to limit the modulus of the complex variates to some suitably chosen range of magnitudes, depending on the dynamic range capabilities of the subsequent signal processing, or to hold the magnitudes fixed and vary only the phases.

Figure 2:
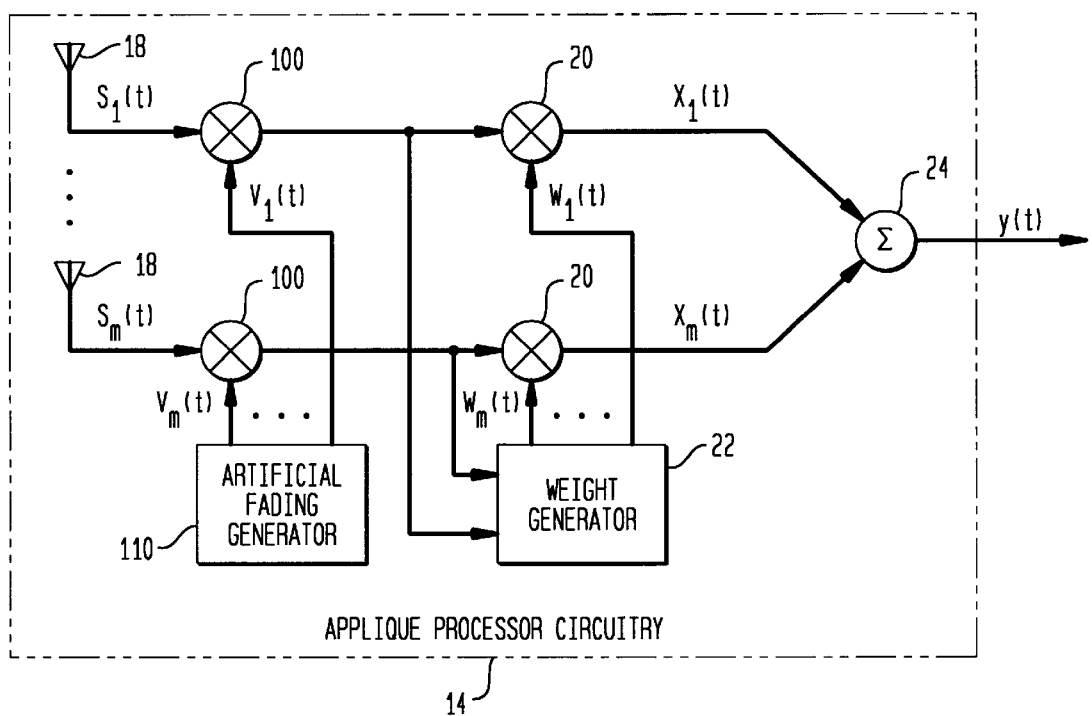

FIG. 2 shows a block diagram of applique processor circuitry employing the present invention. Structures designated by the same reference numerals operate in the same manner as described for FIG. 1 except as described below. Comparing this to the applique processor circuitry from FIG. 1, it can be seen that the present invention additionally comprises complex multipliers 100, and an artificial fading generator 110. Fading generator 110 produces M signals $v_1(t), \ldots, v_M(t)$, which are uncorrelated time-varying complex variates whose amplitudes and phases may resemble environmentally induced fading. The complex multipliers 100, multiply received signals $s_1(t), \ldots, s_M(t)$ by corresponding complex variates $v_1(t), \ldots, v_M(t)$ to produce modified signals $q_1(t), \ldots, q_M(t)$. The resulting plurality of modified signals is then weighted and combined as in prior art, e.g. so as to minimize the mean-squared error in the output signal $y(t)$.

Complex variates $v_1(t), \ldots, v_M(t)$ may be produced illustratively by a digital signal processor, using a table lookup or numerous other techniques apparent to one skilled in the art. The precise time behavior of these variates has been shown to not be critical to the efficacy of the invention. A Rayleigh fading profile has been shown to be effective. Simple variation profiles can be used, illustratively, the complex variates may remain constant in magnitude and vary only in phase, or the complex variates may remain constant in phase and vary only in magnitude.

The rate of variation of the complex variates must be fast enough that there is some nontrivial variation across the L-symbol time window over which weights $w_1(t), \ldots, w_M(t)$ are computed, but not so fast that the variation rate is close to the maximum fading rate at which the system is capable of operating. In practice, experimentation may be necessary to determine an appropriate variation rate and profile.

Numerous modifications and alternative embodiments of the invention will be apparent to those skilled in the art in view of the foregoing description, such as combining the artificial fading generation processing with the weight generation processing. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

What is claimed is:

1. An apparatus for performance improvement of a digital wireless receiver comprising:

a processing circuit for processing a plurality of received signals and providing a processed signal, wherein each of said plurality of received signals is multiplied by a corresponding time-varying complex variate to yield one of a plurality of modified signals, said plurality of modified signals are then weighed and combined to provide said processed signal; and a generation circuit for generating said corresponding time-varying complex variate.

2. The apparatus as recited in claim 1 wherein said corresponding time-varying complex variate has fixed magnitude and varying phase.

3. The apparatus as recited in claim 1 wherein said corresponding time-varying complex variate has varying magnitude and fixed phase.

4. The apparatus as recited in claim 1 wherein said corresponding time-varying complex variate is produced with a table lookup.

5. The apparatus as recited in claim 1 wherein said corresponding time-varying complex variate has a Rayleigh fading profile.

6. The apparatus as recited in claim 1 wherein said plurality of received signals comprise TDMA mobile radio signals.

7. The apparatus as recited in claim 6 wherein said TDMA mobile radio signals comprise IS-136 based mobile radio signals.

8. The apparatus as recited in claim 1 wherein said processing circuit comprises a digital signal processor.

9. The apparatus as recited in claim 1 wherein said generation circuit comprises a digital signal processor.

10. A method for performance improvement of a digital wireless receiver comprising the steps of:

processing a plurality of received signals;

multiplying each of said received signals by a corresponding time-varying complex variate yielding one of a plurality of modified signals; and, weighting and combining each of said plurality of modified signals to provide a processed signal.

11. The method as recited in claim 10 wherein said corresponding time-varying complex variate has fixed magnitude and varying phase.

12. The method as recited in claim 10 wherein said corresponding time-varying complex variate has varying magnitude and fixed phase.

13. The method as recited in claim 10 comprising the additional step of producing said corresponding time-varying complex variate with a table lookup.

14. The method as recited in claim 10 wherein said corresponding time-varying complex variate has a Rayleigh fading profile.

15. The method as recited in claim 10 wherein said plurality of received signals comprise TDMA mobile radio signals.

16. The method as recited in claim 15 wherein said TDMA mobile radio signals comprise IS-136 based mobile radio signals.

17. The method as recited in claim 10 wherein the step of processing a plurality of received signals a digital signal processor.

18. The method as recited in claim 10 comprising the additional step of generating said time varying complex variate utilizing a digital signal processor.

* * * * *